United States Patent [19]

Futamura

[11] Patent Number: 4,808,787

[45] Date of Patent: Feb. 28, 1989

[54] WIRE-CUT ELECTRICAL DISCHARGE MACHINING EQUIPMENT

[75] Inventor: Shoji Futamura, Kawasaki, Japan

[73] Assignee: Institute of Technology Precision Electrical Discharge Works, Japan

[21] Appl. No.: 122,046

[22] Filed: Nov. 17, 1987

[30] Foreign Application Priority Data

| Nov. 17, 1986 [JP] | Japan | 61-273190 |
| Mar. 10, 1987 [JP] | Japan | 62-54963 |
| May 15, 1987 [JP] | Japan | 62-118369 |
| Jun. 29, 1987 [JP] | Japan | 62-162025 |

[51] Int. Cl.$^4$ ............................................. B23H 7/02
[52] U.S. Cl. ................................ 219/69 W; 219/69 D
[58] Field of Search ............... 219/69 W, 69 D, 69 R, 219/69 V; 204/206, 224 M

[56] References Cited

U.S. PATENT DOCUMENTS

| 4,565,915 | 1/1986 | Girardin | 219/69 W |
| 4,647,747 | 3/1987 | Goto | 219/69 W |

FOREIGN PATENT DOCUMENTS

| 144935 | 11/1980 | Japan | 219/69 W |
| 156126 | 9/1982 | Japan | 219/69 W |
| 249219 | 11/1986 | Japan | 219/69 W |

Primary Examiner—A. D. Pellinen
Assistant Examiner—Geoffrey S. Evans
Attorney, Agent, or Firm—McGlew and Tuttle

[57] ABSTRACT

A wire-cut electrical discharge machining apparatus having upper and lower tables which are disposed on a bed and movable in such directions as to intersect orthogonally with each other, and a wire electrode which is movably stretched so that a workpiece placed on the upper table can be machined by an electrical discharge produced between the electrode and the workpiece, and characterized in that a through hole is provided at least in the upper table, and upper and lower wire guides are provided above and below the through hole respectively, or inside the same, so that the wire electrode can be discharged via the lower wire guide.

9 Claims, 5 Drawing Sheets

WIRE-CUT ELECTRICAL DISCHARGE MACHINING EQUIPMENT

BACKGROUND OF THE INVENTION

This invention relates generally to a wire-cut electrical discharge machining apparatus for machining a workpiece by generating an electrical discharge between the workpiece and a travelling wire electrode to which discharging voltage is applied, and more specifically to a wire-cut electrical discharge machining apparatus which is modified so as to achieve improved machining accuracy.

DESCRIPTION OF THE PRIOR ART

Figure 1:
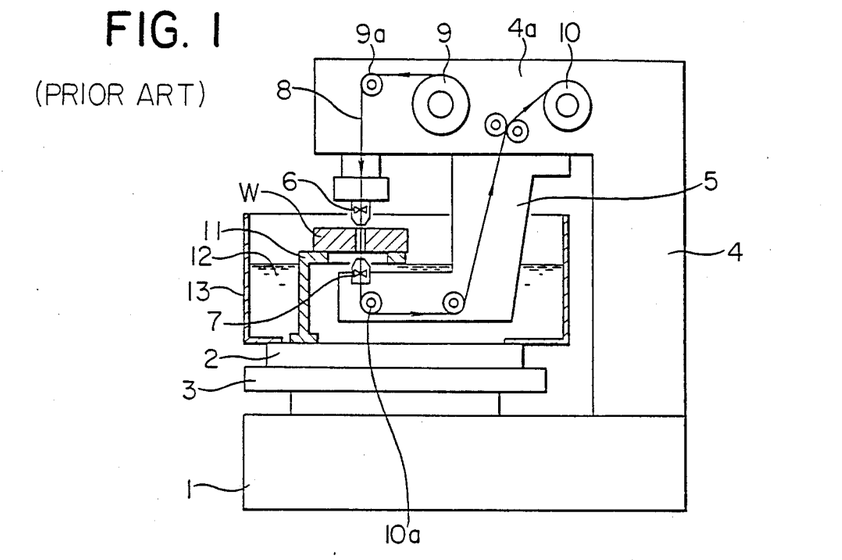
FIG. 1 is a partially cross-sectional front view illustrating the essential parts of a wire-cut electrical discharge machining apparatus of a conventional type.

In general, a wire-cut electrical discharge machining apparatus has such a construction that a wire electrode, to which discharge voltage is applied, is caused to travel to produce an electrical discharge between the electrode and a workpiece, for removing metal from the workpiece. FIG. 1 is a partially cross-sectional explanatory diagram illustrating the essential parts of a wire-cut electrical discharge machining apparatus of a conventional type. In the figure, an upper table 2 and a lower table 3 are provided on a bed 1 in such a fashion that both the tables 2 and 3 can be slided in mutually orthogonally intersecting directions on a horizontal plane so as to constitute a numerically controllable X-Y table. On an end of the bed 1, provided in an upright position a substantially inversed L-shaped column 4, with a girder portion 4a thereof is disposed in a cantilevered fashion above the upper table 2. Beneath the girder portion 4a, fixedly fitted is a substantially L-shaped lower arm 5. An upper wire guide 6 and a lower wire guide 7 are provided on the end portions of the column girder portion 4a and the lower arm 5, respectively, with a wire electrode 8 being vertically movably stretched between the upper and lower wire guides 6 and 7. Numerals 9 and 10 designate an electrode pay-off and take-up reels, respectively. The wire electrode 8 is stretched between the upper and lower wire guides 6 and 7 via guide rollers 9a and 10a in such a manner that the wire electrode 8 can be moved in a direction shown by arrow in the figure. On the upper table 2 there are, provided a workpiece holder 11 on which a workpiece W is placed, and a machining tank 13 for holding a working fluid 12.

With the above-mentioned construction, the workpiece W can be discharge-machined by applying discharge voltage to the wire electrode 8 and causing the electrode 8 to travel in a direction shown by arrow in the figure.

In performing the so-called wire-cut electrical discharge machining, as described above, it is a general practice to inject the working fluid 12 upward or downward along the wire electrode 8 through a nozzle toward the discharging area between the wire electrode 8 and the workpiece W. The injected working fluid 12 drips down from the above-mentioned discharge-machining area and is recovered in the machining tank 13.

In the above-mentioned conventional wire-cut electrical discharge machining apparatus having such a construction that the substantially L-shaped lower arm 5 is fixedly fitted to the lower part of the girder portion 4a of the column 4, various problems are encountered, such as deflection of the lower arm 5 due to the tension caused by the wire electrode 8, large thermal deformation, and variability in the relative positions of the electrode 8 and the work piece W. When machining a large-sized workpiece W, the cantilevered length of the free end of the lower arm 5 has to be increased. This could increase the variation in the relative positions of the electrode 8 and the workpiece W, resulting in lowered machining accuracy. Furthermore, the lower arm 5, most of which is immersed in the working fluid 12, is subject to corrosion.

SUMMARY OF THE INVENTION

It is the first object of this invention to provide a wire-cut electrical discharge machining apparatus having high rigidity and machining accuracy.

It is the second object of this invention to provide a wire-cut electrical discharge machining apparatus which prevents members constituting the apparatus from being attacked by the working fluid to ensure a long service life.

It is the third object of this invention to provide a wire-cut electrical discharge machining apparatus which prevents the working fluid from leaking, and the members from being damaged by falling workpiece chips after machining.

DETAILED DESCRIPTION OF THE EMBODIMENTS

Figure 2:
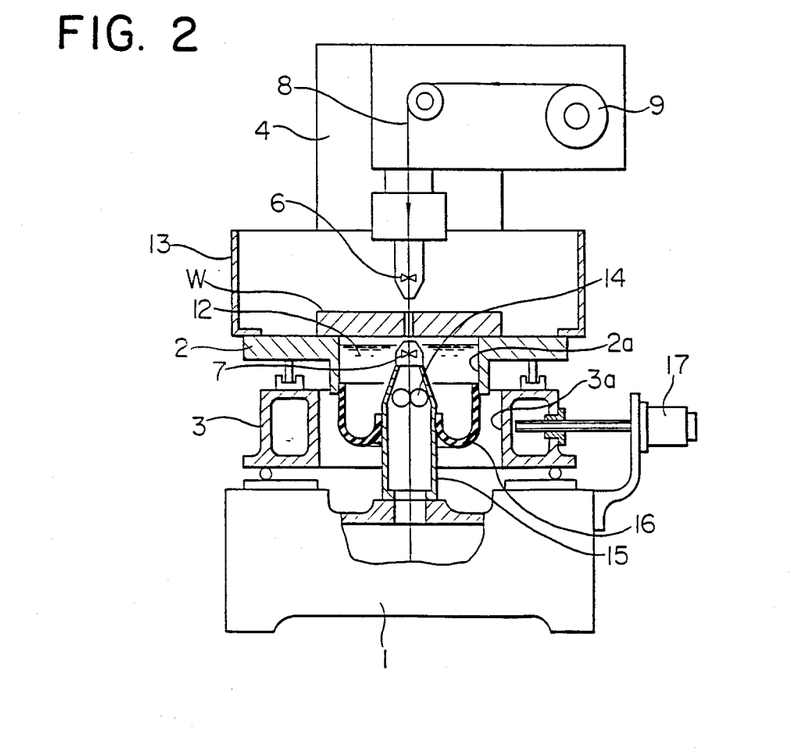
FIG. 2 is a partially cross-sectional front view illustrating a first embodiment of this invention.

FIG. 2 is a partially cross-sectional front view of a first embodiment of this invention, and like parts are indicated by corresponding reference numerals shown in FIG. 1. In FIG. 2, through holes 2a and 3a are provided vertically in the middle of an upper table 2 and a lower table 3, respectively. If the end edge of the through hole 2a is protruded downward, consideration is given so that the protruded portion is prevented from interfering with the through hole 3a of the lower table 3. Next, on the upper central part of a bed 1, provided in an upright position there is a hollow support post 15 in which a lower wire guide 7 and a wire feed driving roller 14 are provided and a wire electrode 8 is adapted to be passed vertically. The lower wire guide 7 in the support post 15 is disposed immediately below an upper wire guide 6 provided in a column 4. Numeral 16 indicates a sealing member, made of rubber or any other flexible material, interposed between the inner edge of the through hole 2a of the upper table 2 and the outer periphery of the support post 15 to hold a working fluid 12. The dimensions of the through holes 2a and 3a to be provided on the upper and lower tables 2 and 3 are selected so that the upper and lower tables 2 and 3, even when moved horizontally, do not interfere with the support post 15, and the material and dimensions of the sealing member 16 are also selected so as to prevent the sealing member 16 from being affected by an unwanted external force. Numeral 17 indicates a feed motor for moving the lower table 3 in the right and left direction. A similar motor (not shown) is also provided for the upper table 2 for moving the table 2 in the direction normal to the paper surface.

With the above construction, the workpiece W is placed securely in position on the upper table 2, and the wire electrode 8 is stretched between the upper lower wire guides 6 and 7. In this state, as a predetermined level of discharge voltage is applied to the wire electrode 8, an electrical discharge is generated between the wire electrode 8 and the workpiece W, so that a predetermined machining can be effected on the workpiece W by moving the upper and lower tables 2 and 3 by means of predetermined control means (not shown). In this case, the wire electrode 8 is moved in the direction shown by arrow by the means of a wire feed driving roller 14, vertically passed through the support post 15, and accumulated inside the bed 1. Even when the upper and lower tables 2 and 3 move horizontally, changing the relative positions thereof with respect to the support post 15, the sealing member 16 interposed between the through hole 2a of the upper table 2 and the support post 15 expands or compresses to follow the change in relative positions, posing no hindrance to the machining of the workpiece W and preventing the working fluid 12 from leaking.

Figure 3:
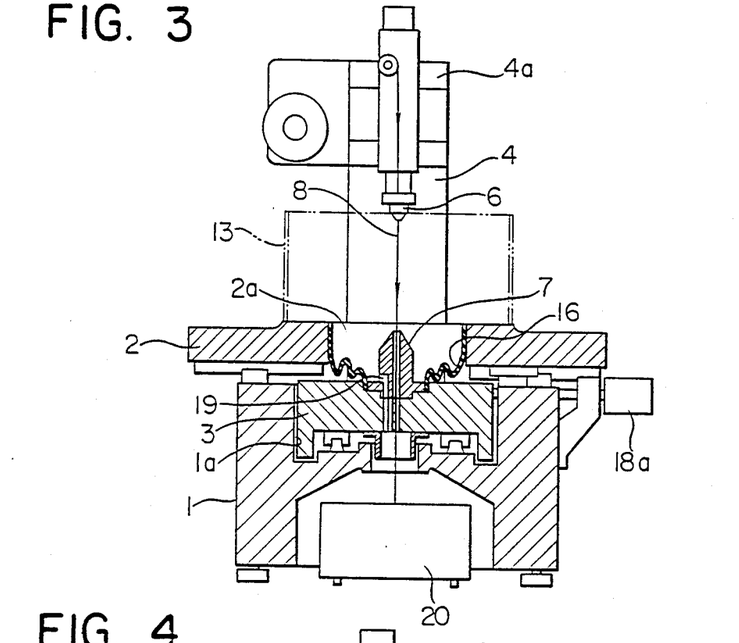
FIGS. 3 and 4 are a partially cross-sectional front view and a partially cross-sectional side elevation illustrating a second embodiment of this invention.
Figure 4:
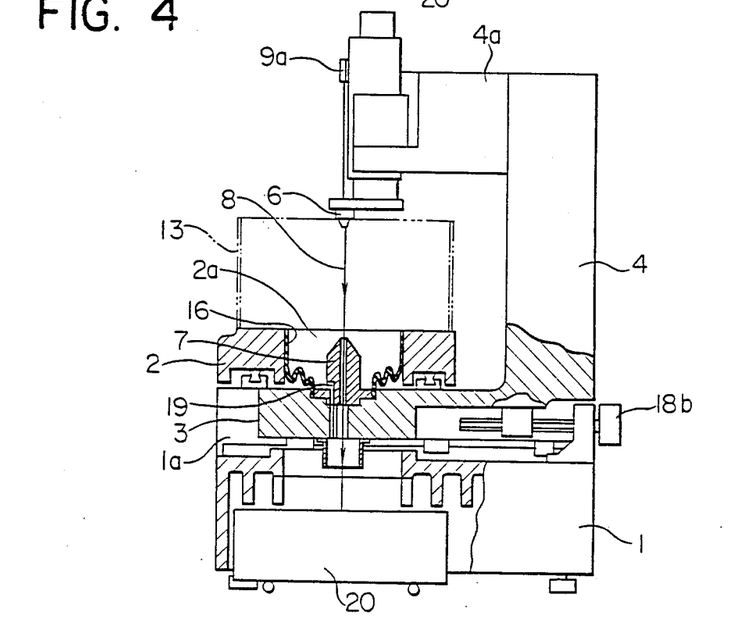

Next, FIGS. 3 and 4 are a partially cross-sectional front view and a partially cross-sectional side elevation of a second embodiment of this invention. Like parts are indicated by like numerals shown in FIG. 2. In both figures, the upper and lower tables 2 and 3 are placed directly on the bed 1 independently of each other, with the column 4 being integrally and fixedly fitted in an upright position on an end of the lower table 3. With this arrangement, the height of both the tables can be reduced by disposing the lower table 3 on a recess 1a provided on the bed 1. Almost in the middle of the upper table 2, provided is the through hole 2a, while the lower wire guide 7 is provided in the middle of the lower table 3. The lower wire guide 7 is disposed immediately beneath the upper wire guide 6 provided on the column 4 in such a fashion as to protrude in the through hole 2a. Numeral 16 refers to a sealing member, made of rubber or any other flexible material, formed into a cup shape. The sealing member 16 is interposed between the inner edge of the through hole 2a of the upper table 2 and the outer periphery of the lower wire guide 7 to form the bottom of a machining tank 13. The inside dimensions of the through hole 2a be provided on the upper table 2 is selected so that the upper and lower table 2 and 3, even when moved horizontally, do no interfere with the lower wire guide 7. The material and dimensions of the sealing member 16, together with the shape and dimensions of the folds thereof, are selected so that the sealing member 16 is not affected by unwanted external forces. Numerals 18a and 18b refer to servo motors, mounted on the upper and lower tables 2 and 3, respectively, and connected to a driving source via a numerical control device (not shown). The lower wire guide 7 incorporates a guide for the wire electrode 8, a wire feed driving roller, etc. (all of them not shown in the figure), and is formed in such a fashion as to permit the wire electrode 8 to be passed therethrough via the lower table 3. 19 refers to a drain hole for discharging a working fluid in the machining tank 13 to the underside of the bed 1 by the aid of a valve (not shown). 20 refers to a used electrode storage box, which is detachably fitted to the bed 1 and used for storing the used wire electrode 8.

With the above construction, a workpiece is securely placed on the upper table 2 directly or by means of a fixture (not shown), with the wire electrode 8 being stretched and caused to travel between the upper wire guide 6 and the lower wire guide 7. Since an electrical discharge is produced between the wire electrode 8 and the workpiece by applying a predetermined discharge voltage to the wire electrode 8, a predetermined electrical discharge machining can be effected on the workpiece by moving the upper and lower tables 2 and 3 by means of the respective predetermined control means not shown) thereof. During machining, the wire electrode 8 is moved in the direction shown by the arrow by means of the wire feed driving roller (not shown) provided inside the lower wire guide 7, passed through the lower wire guide 7, the lower table 3 and the bed 1, and accumulated in a cut shape in the used electrode storage box 20 provided under the bed 1. Even when the upper and lower tables 2 and are moved horizontally, causing the relative positions of the upper and lower tables 2 and 3 to change, the sealing member 16 interposed between the through hole 2a and the lower wire guide 7 is deformed, or expanded or compressed to absorb the change, thus posing no hindrance to the machining of the workpiece and preventing the working fluid in the machining tank 13 from leaking.

Figure 5:
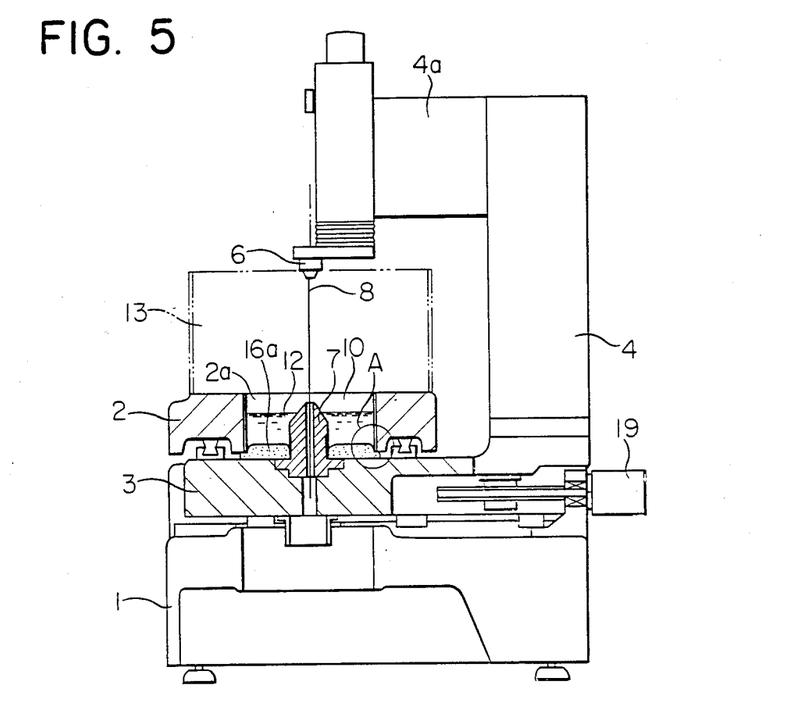
FIG. 5 is a partially cross-sectional side elevation illustrating a fourth embodiment of this invention.
Figure 6:
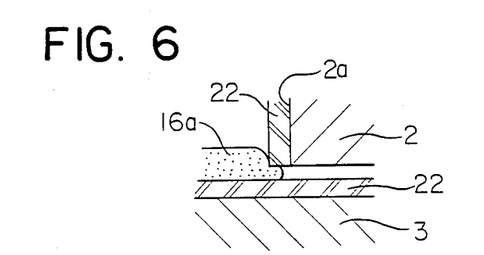
FIG. 6 is an enlarged cross-sectional view of Part A shown in FIG. 5.

FIG. 5 is a partially cross-sectional side elevation view illustrating a third embodiment of this invention, and FIG. 6 is an enlarged cross-sectional view of Portion A in FIG. 5. Like parts are indicated by like numerals shown in FIGS. 2 through 4. In both figures, 16a refers to a sealing fluid material, chiefly composed of various polymers such as silicone, and various ethers such as phenyl ether, which is poured into the bottom of the through hole 2a of the upper table 2 for closing the gap between the upper and lower tables 2 and 3. 22 refers to a non-adhesive coating film, made of a material having low surface energy, such as tetrafluoroethylene.

The sealing fluid material 16a, which is used for preventing the working fluid 12 from leakage, or discharging to the outside by closing the gap between the upper and lower tables 2 and 3, as described above, must have at least the following three requirements.

The first requirement is that the sealing fluid material 16a must have a higher specific gravity than the working fluid 12. This is because the sealing fluid material 16a must settle below the working fluid 12 in order to close the gap between the upper and lower tables 2 and 3 on the bottom of the through hole 2a, as shown in FIG. 5. The second requirement is that the wetting properties of the sealing fluid material 16a on the surface of any other component member with which the material 16a comes in contact must be of such a value that the material 16a does not flow out of the gap. The reason for this will be described in the following.

Figure 7:
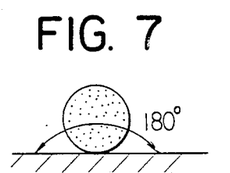
FIGS. 7 through 9 are diagrams illustrating the wetting properties of the working fluid.
Figure 8:
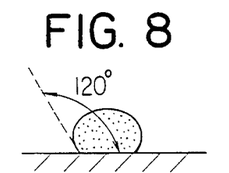
Figure 9:
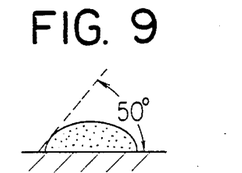

FIGS. 7 through 9 show diagrams of assistance in explaining the wetting properties of a fluid on a wall surface. FIG. 7 illustrates the state where the fluid is not wetted at all, FIG. 8 the state where it is wetted slightly, and FIG. 9 the state where it is wetted out sufficiently. The angle show in each figure are generally called the angle of contact; the lower the wetting properties of the fluid the larger becomes the angle of contact. The degree of wetting depends on the surface tension of the fluid itself and the affinity between the fluid and the wall surface with which it comes in contact; the higher the surface tension the lower the wetting properties. If the wall surface is made of a material having good non-adhesive properties, the affinity between the wall surface and the fluid is lowered, leading to decreased wetting properties.

In order to positively seal the above-mentioned gap, the sealing fluid material 16a must not be allowed to infiltrate into the gap, or must be held in the state where it infiltrates into the gap but does not flow out, as shown in FIG. 6. To this end, the sealing fluid material 16a must have low wetting properties. If the wetting properties of the sealing fluid material 16a on the surface of a component member are high, the sealing fluid material 16a runs over the surface, flowing out of the gap. In this state, the sealing fluid material 16a does not serve the purpose. It is for this reason that the above-mentioned second requirement is needed for the sealing fluid material 16a.

A non-adhesive coating film 22 shown in FIG. 6 is provided as necessary on the inside surface of the through hole 2a and the upper surface of the lower table 3. This non-adhesive coating film 22 need not be provided if the surface of the component member with which the sealing fluid material 16a a comes in contact has sufficient wetting properties to be used in that state.

The third requirement is that the sealing fluid material 16a must not substantially have a solubility in the working fluid 12. If the sealing fluid material 16a reacts with the working fluid 12 and is dissolved in it, the desired purpose cannot be achieved. It should be noted, however, that even if the sealing fluid material 16a has solubility, it can serve the purpose as long as its dissolution proceeds only slowly and does not pose any practical hindrance to electrical discharge machining.

With the above-mentioned construction, electrical discharge machining can be effected on a workpiece (not shown) placed on the upper table 2 by causing the wire electrode 8 to travel. In this case, even when the upper and lower tables 2 and 3 move relative to each other, the working fluid 12 is held in the through hole 2a and prevented from leakage or flowing out because the sealing fluid material 16a deposited on the bottom of the through hole 2a, closing the gap between both the tables 2 and 3.

Figure 10:
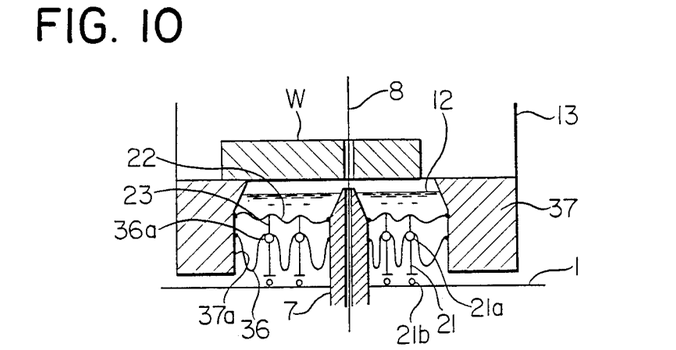
FIGS. 10 through 12 are longitudinal sectional views illustrating fifth through seventh embodiments of this invention, with the essential parts thereof enlarged.

FIG. 10 is a longitudinal section illustrating a fourth embodiment of this invention, with the essential parts thereof enlarged. Like parts in the figure correspond with like numerals shown in FIGS. 2 through 4. In the figure, numeral 37 refers to an X-Y table having a through hole 37a and provided on the bed 1 in such a fashion as to be movable horizontally by numerical control. 21 refers to a support pillar having a rod member 21a fixedly fitted to the upper end thereof for supporting the sealing member 36 via the fold 36a of the sealing member 36, and a roller 21b provided on the lower end thereof to permit the support pillar 21 to roll on the bed 1. 22 refers to a metal net formed by braided metal fine wires in a horizontally expandable fashion, and stretched above the sealing member 36 so as to hang over the almost entire upper part of the sealing member 36. 23 refers to a connecting spacer for holding the sealing member 36 and the metal net 22 at almost equal spacings and causing the sealing member 36 and the metal net 22 to move in almost synchronism with each other. The size of mesh of the metal net 22 is selected appropriately in accordance with the size of metal chips separated from the workpiece W and other falling objects.

With the above construction, electrical discharge machining is effected by moving the X-Y table 37 on which the workpiece W and the machining tank 13 are placed on a horizontal plane. The X-Y table 37, which carries the working fluid 12, is moved extremely smoothly on the horizontal plane because the sealing member 36 constituting the bottom of the machining tank 13 is supported by the support pillar 21. As both the sealing member 36 and the metal not 22 can be moved in almost synchronism with each other, any falling objects from above can be caught on the metal net 22, preventing the sealing member 36 from being damaged by falling objects.

Figure 11:
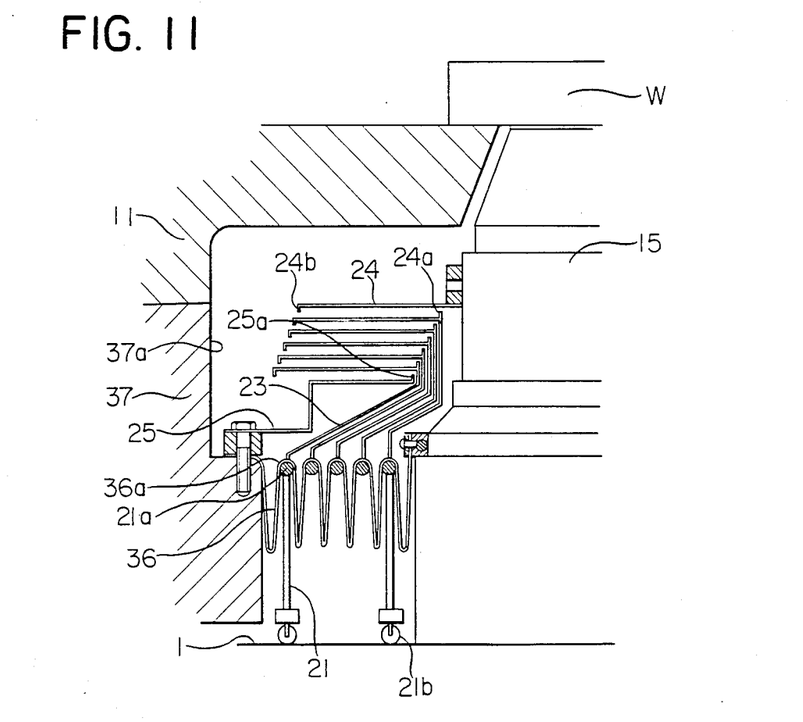

FIG. 11 is a longitudinal section illustrating a fifth embodiment of this invention, with the essential parts thereof enlarged. Like parts are shown by corresponding numerals in the fourth embodiment described above. In the figure, the support pillar 21 is disposed in a number corresponding to the number of folds 36a of the sealing member 36, though a part thereof is not shown in the figure. Next, 24 refers to a protective cover fitted to the upper end of a support member 23 provided on the fold 36a of the sealing member 36, with a plurality of the protective covers 24 being provided on multiple support members 23 in a stacked fashion and in such a manner as to be horizontally movable independently. On the central and peripheral parts of the vertically adjoining protective covers 24, provided are engaging pieces 24a and 24b for preventing the sealing member 36 from stretching excessively. On a protective cover 25 fixedly fitted to the inner edge of the through hole 37a of the X-Y table 37 provided is an engaging piece 25a which is to be engaged with the engaging piece 24b on the peripheral part of the protective cover 24 on the lowermost stage. The protective covers 24 and 25 are adapted to hang over the almost entire upper part of the sealing member 36, as in the case of the above-mentioned fourth embodiment.

With the above arrangement, electrical discharge machining is effected as the wire electrode (not shown) travels vertically in the support post 15, and the workpiece W is moved on a horizontal plane by means of the X-Y table 37 and the workpiece holder 11. In this case, when the X-Y table 37 is moved leftward, for example, the protective cover 25 is also moved leftward. And, as the protective cover 25 is moved further leftward in the state where the engaging piece 25a provided on the central part of the protective cover 25 is engaged with the engaging piece 24b provided on the peripheral part of the protective cover 24 immediately above the protective cover 25, the protective cover 24 follows the cover 25 to move leftward. In this case, the sealing member 36 is also moved leftward, following the support member 23 while stretching smoothly without receiving unwanted tension since the sealing member 36 is supported by the support pillar 21, which is adapted to be rollable on the bed 1 by the aid of the roller 21b. On the contrary, when the X-Y table is moved rightward, the engaging piece 25a of the protective cover 25 causes the sealing member 36 to move rightward by means of the central part or upper end part of the support member 23, allowing the sealing member 36 to be shrunk without receiving unwanted tension. Thus, falling objects can be prevented from falling on the sealing member 36 since they are caught on the protective covers 24 and 25, as in the above-mentioned first embodiment, because the protective covers 24 and 25 exist above the sealing member 36, irrespective of the relative positions of the workpiece W and the support post 15 through which the wire electrode 8 is passed.

Figure 12:
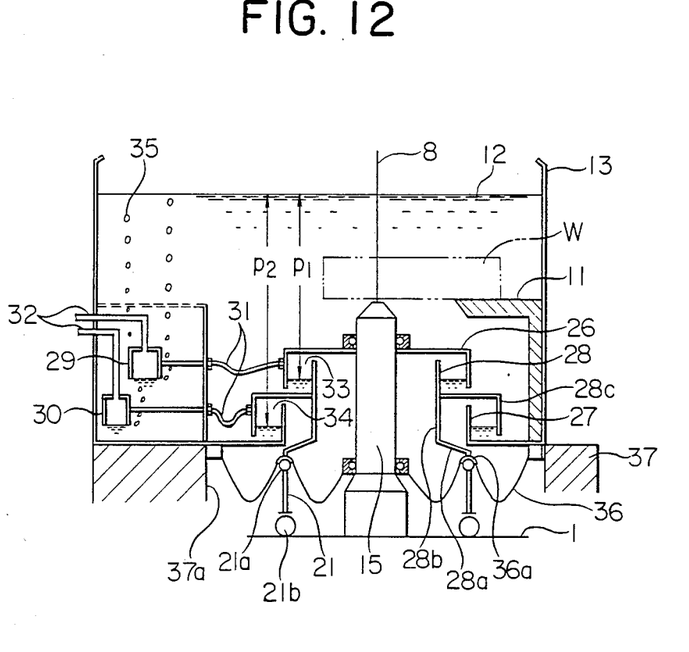

Next, FIG. 12 is a longitudinal section illustrating a sixth embodiment of this invention, with the essential parts thereof enlarged. Like parts are shown by corresponding numerals in the fourth and fifth embodiments described above. In the figure, numeral 26 refers to a fixed protective cover formed into the shape of a short cylinder having an opening end facing downward, and fixedly fitted in the vicinity of the upper end of the support post 15. 27 refers to a movable protective cover comprising a flat plate having at the center thereof a short cylinder with an opening facing upward, and fixedly fitted at the peripheral part thereof to the inside edge of the through hole 37a of the X-Y table 37. Next, 28 indicates an intermediate protective cover consisting of a hollow truncated cone 28a and a hollow cylinder 28b integrally formed above the hollow truncated cone 28a, with the lower end being fixedly fitted to the fold 36a of the sealing member 36. An outer cylinder 28c having an opening facing downward is fixedly fitted to the outer periphery of the hollow cylinder 28b. The upper end of the hollow truncated cone 28b is disposed in the fixed protective cover 26 while the outer cylinder 28c on the outside of the movable protective cover 27. Numerals 29 and 30 are fluid level adjusting pots; any one thereof being connected to the fixed protective cover 26 and the outer cylinder 28c of the intermediate protective cover 28 via a connecting tube 31; and the other thereof being connected to connect air source (not shown) via piping 32. The a compressed locations of the fluid level adjusting pots are selected so that the location at which the fixed protective cover 26 overlaps the intermediate protective cover 28 and the location at which the outer cylinder 28c of the intermediate protective cover 28 overlaps the movable protective cover 27 almost agree with the head, that is, the depth from the fluid level when the working fluid 12 is poured (so that static fluid pressure values at the respective locations become $p_1$ and $p_2$).

With the above-mentioned arrangement, the working fluid 12 is poured into the machining tank 13 while compressed air is fed from a compressed air source through the piping 32, the fluid level adjusting pots 29 and 30, and the connecting tube 31. At this time, pressures in the fluid level adjusting pots 29 and 30 are adjusted to $p_1$ and $p_2$, respectively. Since the static fluid pressures in an annular chamber 33 defined by the fixed protective cover 26 and the intermediate protective cover 28 and in an annular chamber 34 defined by the intermediate protective cover 28 and the movable protective cover 27 are $p_1$ and $p_2$, respectively, as shown in FIG. 3, the fluid pressures developed by the working fluid 12 is balanced with the compressed air pressures. Thus, gas/liquid interfaces are formed in the above-mentioned annular chambers 33 and 34, preventing the working fluid 12 from entering into the sealing member 36. Once a steady state as shown in FIG. 12 is reached, compressed air may be supplied in such a small quantity that a small amount of air bubbles 35 is evolved from the fluid level adjusting pots 29 and 30. In the above steady state, the workpiece W can be discharge-machined by causing the wire electrode 8, to which discharge voltage is applied, to travel, and horizontally moving the workpiece W by controlling the X-Y table 37 and the workpiece holder 11. In this case, even when a horizontal relative movement takes place among the protective covers 26, 27 and 28, falling objects can be caught on the protective covers 26, 27 and 28, and prevented from falling on the sealing member 36, as in the case of the above-mentioned embodiments, because the intermediate protective over 28 is smoothly movable while being supported by the support pillar 21 having the roller 21b via the fold 36a of the sealing member 36, and hanging over the almost entier upper part of the sealing member 36, in conjunction with the other protective covers 26 and 27. Furthermore, since the gas/liquid interfaces in the annular chambers 33 and 34 remain almost unchanged even when the relative positions of the protective covers 26, 27 and 28 change, the working fluid 12 never enters the sealing member 36. If damage is accidentally caused to the sealing member 36 for some reason or other, the air pressure in a space above the sealing member 36 decreases, causing the working fluid 12 to enter the sealing member 36 from the annular chambers 33 and/or 34 to destroy the balance at the gas/liquid interfaces. Such an unexpected event can be easily detected from the outside and countermeasures can be quickly taken because the air bubbles 35 stop evolving from the fluid level adjusting pots 29 and/or 30.

Although a wire feed driving roller is provided in the support post for feeding the wire electrode in the above embodiments, the same effect can be achieved by installing the wire feed driving roller in the bed. The used wire electrode may be discharged out of the bed, or led out of the bed via guide rollers and wound up on a reel, instead of accumulating in the used electrode storage box disposed in the bed. Furthermore, the material of the sealing member interposed between the inner edge of the through hole provided on the upper table or the X-Y table and the lower guide block is not limited to rubber, but the sealing member may be made of a plastic, cloth or any other flexible material, or formed into metallic bellows. In other words, the sealing member may be made of any material which is flexible and has liquid impermeability, that is, a function of accommodating a working fluid without leaks. Next, the through hole provided on the upper table, the lower table or the X-Y table need not be provided at the central part, but may be provided on the edge portion or on an area ranging from the central part to the edge portion. The column provided on the bed in an upright position need not be limited to that described in the above embodiments. The same effect can be achieved with a gate type or any other shape of the column. In addition, the above embodiments involve electrical discharge machining of a workpiece immersed in a working fluid, which is held in a tank, using a sealing member, made of a flexible material. However, the sealing member may be omitted in such a case where electrical discharge machining is effected while the working fluid is injected or sprayed onto the workpiece. In this case, a cover, made of a similar flexible material to that used for the sealing member, or a material that permits deformation, can be used in such a manner that movement of the upper table and the lower table, or the X-Y table, is not hampered so as to prevent the working fluid from splashing on the upper table, the lower table or any other mechanical components. Furthermore, the sealing fluid material described in the third embodiment is not limited to the construction shown in FIG. 5, but other constructions, as shown in FIG. 2, may be used. Furthermore, the metal net used as a protective cover in the fourth embodiment may be replaced with a net made of a non-metallic material, such as plastic fibers, as long as such a non-metallic material is not attacked by the working fluid and has an effect of catching and holding machining chips and other falling objects. Moreover, the plate-shaped protective cover shown in the fifth embodiment may be made not only of a metallic material but of a non-metallic or any other commonly used structural material. And, the number of protective cover stacks may be chosen appropriately. In the sixth embodiment, a single intermediate protective cover is used, but a plurality of intermediate protective covers may be used as necessary. Needless to say, other shapes of the protective cover than the shape shown in the embodiment may be selected freely.

Having the afore-mentioned construction and operation, this invention has the following effects.

(1) Since no cantilevered lower arm as used in the prior art is required, the lower wire guide can be precisely positioned and held in position, resulting in improved accuracy.

(2) With the rigidity of the machine, including tables, improved, the tension of the wire electrode can be increased, and wire electrodes having diameters more than 0.3 mm can be used.

(3) The machine has high corrosion resistance because only a small portion of the lower guide block comprising the machine is immersed in the working fluid.

(4) In a construction in which the upper and lower tables are independently disposed on the same bed, adverse effects of movement of other tables can be eliminated, and machining accuracy can be further improved.

(5) In a construction in which protective means are provided for the sealing member comprising the bottom of the machining tank, accidents associated with the leakage of working fluid can be eliminated, leading to a substantial increase in reliability.

What is claimed is:

1. A wire-cut electrical discharge machining apparatus having upper and lower tables which are disposed on a bed and movable in such directions as to intersect orthogonally with each other, and a wire electrode which is movably stretched so that a workpiece placed on said upper table can be machined by an electrical discharge produced between said wire electrode and said workpiece, and characterized in that a through hole is provided at least in said upper table, and upper and lower wire guides are provided above and below said workpiece, said lower wire guide being positioned inside or below said through hole, so that said wire electrode can be discharged out of said apparatus via said lower wire guide.

2. A wire-cut electrical discharge machining apparatus as set forth in claim (1) wherein a through hole is provided in said lower table, and a lower wire guide is provided on said bed.

3. A wire-cut electrical discharge machining apparatus as set forth in claim (1) wherein a column is provided integrally with said lower table in an upright position, and an upper wire guide is provided on a girder portion comprising the upper part of said column, and a lower wire guide is provided on said lower table.

4. A wire-cut electrical discharge machining apparatus having upper and lower tables which are disposed on a bed and movable in such directions as to intersect orthogonally with each other, and a wire electrode which is movably stretched so that a workpiece placed on said upper table can be machined by an electrical discharge produced between said wire electrode and said workpiece, and characterized in that a through hole is provided at least in said upper table, a sealing means for preventing a working fluid from flowing out is provided on the bottom of said trough hole, and upper and lower wire guides are provided above and below workpiece, said lower wire guide being positioned inside or below said through hole, said wire electrode being discharged out of said apparatus via said lower wire guide.

5. A wire-cut electrical discharge machining apparatus as set forth in claim (4) wherein a through hole is provided in said lower table, a sealing means is provided on the bottom of any one of said through holes, and a lower wire guide is provided on said bed.

6. A wire-cut electrical discharge machining apparatus as set forth in claim (4) wherein a column is provided integrally with said lower table in an upright fashion, and an upper wire guide is provided on a girder portion comprising the upper part of said column, and a lower wire guide is provided on said lower table.

7. A wire-cut electrical discharge machining apparatus according to either claim 4, or 5 or 6 wherein said sealing means is a sealing member made of a material having flexibility and liquid impermeability.

8. A wire-cut electrical discharge machining apparatus according to either claim 4 or 5 or 6 wherein said sealing means is a fluid material having substantially non-solubility in said working fluid and higher specific gravity than said working fluid, the wetting property value of said fluid material is selected such that said working fluid is prevented from flowing out through the gap between said upper and lower tables and prevented from flowing out of the gap between said lower table and said bed.

9. A wire-cut electrical discharge machining apparatus having upper and lower tables which are disposed on a bed and movable in such directions as to intersect orthogonally with each other, and a wire electrode which is movably stretched so that a workpiece placed on said upper table can be machined by an electrical discharge produced between said wire electrode and said workpiece, and characterized in that a through hole is provided at least in said upper table, a sealing member having flexibility and liquid impermeability is provided on the bottom of said through hole, a protective cover formed above said sealing member so as to hang over said sealing member, and upper and lower wire guides are provided above and below workpiece, said lower wire guide being positioned inside or below said through hole, so that said wire electrode can be discharged out of said apparatus via said lower wire guide.

* * * * *